(12) United States Patent
Orbon et al.

(10) Patent No.: US 10,442,532 B2
(45) Date of Patent: Oct. 15, 2019

(54) COMPOSITE SWASHPLATE GUIDE FOR ROTORCRAFT CONTROL SYSTEMS

(71) Applicant: Sikorsky Aircraft Corporation, Stratford, CT (US)

(72) Inventors: James Orbon, New Haven, CT (US); Dean Nguyen, Greenwich, CT (US); Kevin Laitenberger, Beacon Falls, CT (US); Steven M. Capelle, Derby, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 204 days.

(21) Appl. No.: 15/707,631

(22) Filed: Sep. 18, 2017

(65) Prior Publication Data
US 2018/0141651 A1    May 24, 2018

Related U.S. Application Data
(60) Provisional application No. 62/423,958, filed on Nov. 18, 2016.

(51) Int. Cl.
*B64C 27/605*    (2006.01)
*B64C 27/72*    (2006.01)

(52) U.S. Cl.
CPC .... *B64C 27/605* (2013.01); *B64C 2027/7238* (2013.01); *B64C 2027/7255* (2013.01)

(58) Field of Classification Search
CPC ....... B64C 27/58; B64C 27/59; B64C 27/605; B64C 2027/7238; B64C 2027/7255

USPC ..................... 416/134 A, 159, 162
See application file for complete search history.

(56) References Cited

U.S. PATENT DOCUMENTS

| | | | |
|---|---|---|---|
| 4,251,187 A | 2/1981 | Hollrock | |
| 5,460,487 A * | 10/1995 | Schmaling | B64C 27/35 267/140.2 |
| 5,810,562 A | 9/1998 | Byrnes et al. | |
| 6,280,141 B1 * | 8/2001 | Rampal | B64C 27/605 416/114 |
| 8,142,158 B2 * | 3/2012 | Schmaling | B64C 27/605 416/149 |
| 9,193,454 B2 * | 11/2015 | Modrzejewski | B64C 27/605 |
| 9,452,830 B2 * | 9/2016 | D'Anna | F16D 3/50 |
| 9,709,089 B2 * | 7/2017 | Bohm | B64C 13/30 |
| 9,884,680 B2 * | 2/2018 | Meyer | B64C 27/33 |
| 2011/0058760 A1 | 3/2011 | Magnus | |
| 2013/0122763 A1 | 5/2013 | Fish et al. | |
| 2018/0290740 A1 * | 10/2018 | Darrow, Jr. | B64C 27/10 |

FOREIGN PATENT DOCUMENTS

WO    2016081057 A1    5/2016

* cited by examiner

*Primary Examiner* — Erick R Solis
(74) *Attorney, Agent, or Firm* — Cantor Colburn LLP

(57) ABSTRACT

A swashplate guide for use with a spherical bearing and which connects with an adjacent component includes a hollow cylindrical tube formed from a composite material. An exterior surface of the hollow cylindrical tube provides an engagement surface with the spherical bearing. A flange arranged at an end of the hollow cylindrical tube provides an interface with the adjacent component.

15 Claims, 8 Drawing Sheets

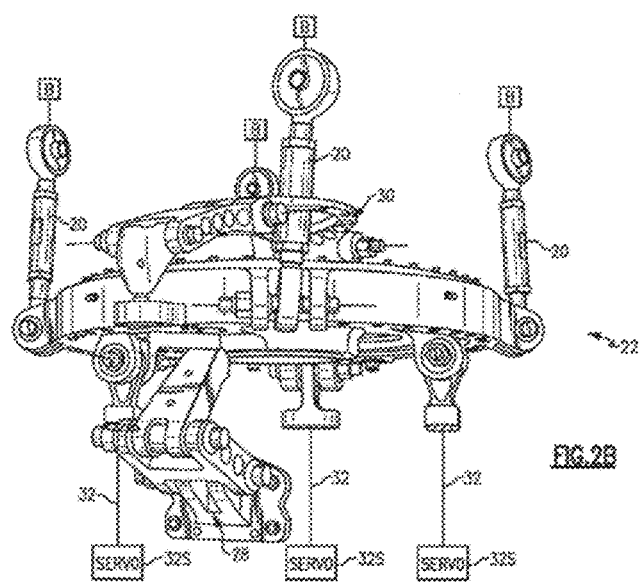

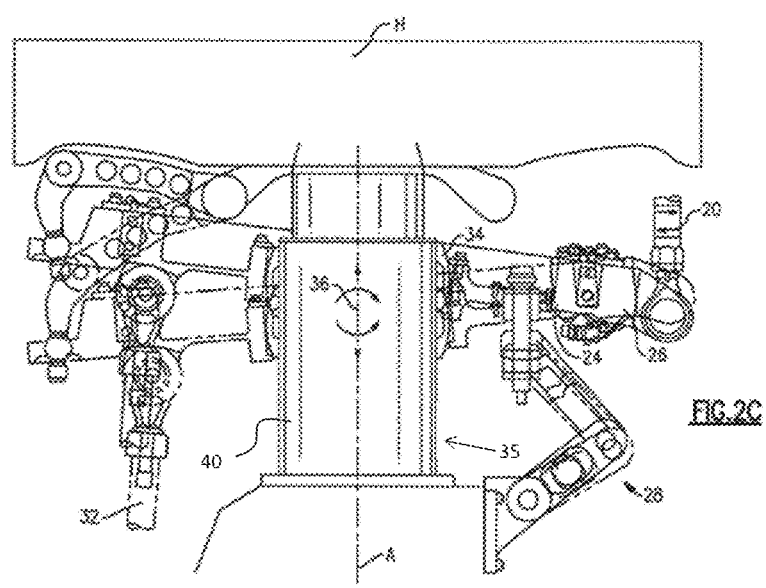

US 10,442,532 B2

COMPOSITE SWASHPLATE GUIDE FOR ROTORCRAFT CONTROL SYSTEMS

CROSS-REFERENCE TO RELATED APPLICATIONS

This application claims the benefit of 62/423,958, filed Nov. 18, 2016, which is incorporated herein by reference in its entirety.

STATEMENT REGARDING FEDERALLY SPONSORED RESEARCH OR DEVELOPMENT

This invention was made with Government support under Agreement No. W911W6-13-2-0003 for the Joint Multi-Role Technology Demonstrator Phase I-Air Vehicle Development program. The Government has certain rights in the invention.

BACKGROUND OF THE INVENTION

Exemplary embodiments of the invention relate to a rotary wing aircraft, and more particularly, to a swashplate for controlling a rotor assembly of a rotary wing aircraft.

Control of a rotary wing aircraft is affected by varying the pitch of the rotor blades individually as the rotor rotates and by varying the pitch of all of the blades together. These are known respectively as cyclic and collective pitch control. Blade pitch control of a rotary wing aircraft is typically achieved through a swashplate assembly which transfers the motion of non-rotating servo-driven control members within to the rotating members.

The swashplate assembly is typically concentrically mounted about a rotor shaft. The swashplate assembly includes two rings connected by a series of bearings with one ring connected to the airframe (stationary), and the other ring connected to the rotor hub (rotating). The rotating ring is connected to the rotor hub through a pivoted link device typically referred to as "scissors", with the static ring similarly connected to the airframe. The rotating swash plate rotates relative the stationary swash plate. Apart from rotary motion, the stationary and rotating swash plate otherwise move as a unitary component. Collective control is achieved by translating the swash plate assembly up and down with respect to the rotor shaft and cyclic control is achieved by tilting the swash plate relative to the rotor shaft.

The stationary ring is typically mounted about the rotor shaft through a spherical ball joint that allows for tilt of the swash plate assembly, with the rotor shaft allowing translation of the swash plate assembly along the axis.

BRIEF DESCRIPTION OF THE INVENTION

According to one embodiment of the invention, a swashplate guide for use with a spherical bearing and which connects with an adjacent component includes a hollow cylindrical tube formed from a composite material. An exterior surface of the hollow cylindrical tube provides an engagement surface with the spherical bearing. A flange arranged at an end of the hollow cylindrical tube provides an interface with the adjacent component.

In addition to one or more of the features described above, or as an alternative, in further embodiments the exterior surface of the hollow cylindrical tube includes a coating.

In addition to one or more of the features described above, or as an alternative, in further embodiments the exterior surface of the hollow cylindrical tube has a desired surface finish compatible for use with the spherical bearing.

In addition to one or more of the features described above, or as an alternative, in further embodiments the hollow cylindrical tube has a coefficient of thermal expansion such that a constant fit is generated between the swashplate guide and the spherical bearing.

In addition to one or more of the features described above, or as an alternative, in further embodiments the composite material includes one or more plies containing a matrix having reinforcing fibers, and the coefficient of thermal expansion is achieved by orienting the fibers in a desired direction.

In addition to one or more of the features described above, or as an alternative, in further embodiments the composite material of the hollow cylindrical tube is substantially identical to a material of the spherical bearing.

In addition to one or more of the features described above, or as an alternative, in further embodiments comprising a pilot associated with the hollow cylindrical tube, wherein the flange extends from a portion of the pilot.

In addition to one or more of the features described above, or as an alternative, in further embodiments the pilot is removably coupled to the hollow cylindrical tube.

In addition to one or more of the features described above, or as an alternative, in further embodiments the pilot is co-cured to the hollow cylindrical tube.

In addition to one or more of the features described above, or as an alternative, in further embodiments the pilot is formed from a metal material.

In addition to one or more of the features described above, or as an alternative, in further embodiments the pilot is integrally formed with an upper end of the hollow cylindrical tube.

According to another embodiment, a rotor system includes a rotationally stationary swashplate pivotally mounted about a central pivot point defined along an axis of rotation and a rotational swashplate which defines a rotor pitch control point along an in-line plane which passes through said central pivot point. A bearing system allows the rotational swashplate to rotate relative to the rotationally stationary swashplate. The rotor system additionally includes a swashplate guide for receiving a shaft and mating to an adjacent component. The swashplate guide includes a hollow cylindrical tube formed from a composite material. A spherical bearing is mounted concentrically about an exterior surface of the hollow cylindrical tube such that the hollow cylindrical shaft provides an engagement surface for the spherical bearing. The swashplate guide includes a flange that provides an interface with the adjacent component.

In addition to one or more of the features described above, or as an alternative, in further embodiments the rotor system is a portion of an aircraft.

In addition to one or more of the features described above, or as an alternative, in further embodiments the composite material includes a matrix containing fibers formed from at least one of fiberglass and graphite.

In addition to one or more of the features described above, or as an alternative, in further embodiments comprising an aircraft using the rotor system.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2B is a side perspective view of the swashplate assembly of FIG. 2A;

FIG. 2C schematic sectional view of the rotor system of FIG. 2A taken along the axis of rotation;

The detailed description explains embodiments of the invention, together with advantages and features, by way of example with reference to the drawings.

DETAILED DESCRIPTION OF THE INVENTION

Figure 1:
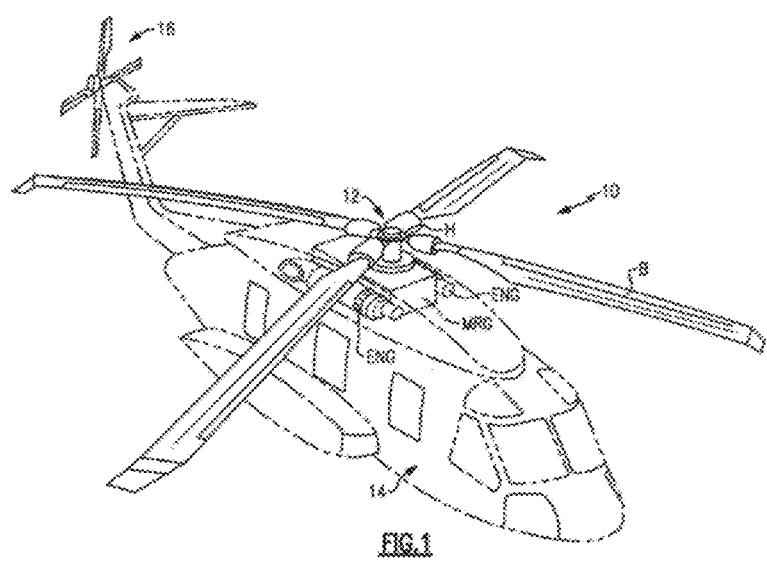
FIG. 1 is a perspective view of an example of a rotary wing aircraft.

FIG. 1 schematically illustrates an exemplary vertical takeoff and landing (VTOL) rotary-wing aircraft 10. The aircraft 10 in the disclosed, non-limiting embodiment includes a main rotor system 12 supported by an airframe 14 having an extending tail which mounts an anti-torque system 16 such as a tail rotor system. The main rotor system 12 includes a multiple of rotor blades B mounted to a rotor hub H. The main rotor system 12 is driven about an axis of rotation A through a main rotor gearbox MRG by one or more engines ENG. The main gearbox MRG may be interposed between the one or more engines ENG, the main rotor system 12 and the anti-torque system 16 such that the main rotor system 12 and the anti-torque system 16 are both driven by the main gearbox MRG. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2A:
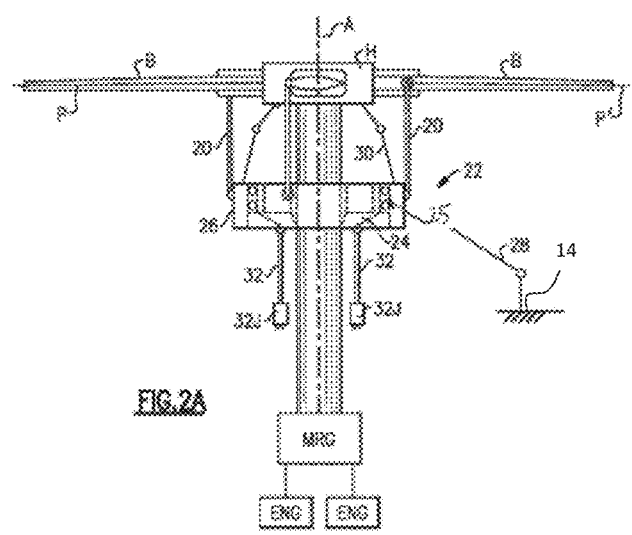
FIG. 2A is a schematic diagram of a rotor system for use with a swashplate assembly.

Referring to FIG. 2A, each rotor blade B is mounted to the rotor hub H so as to be flexible about a pitch change axis P. It should be understood that various attachment systems and rotor blade pitch change systems may alternatively or additionally be utilized. Pitch change loads are imparted to each rotor blade B by pitch control rods 20. One end section of each pitch control rod 20 is articulatably connected to the rotor blade B and an opposite end section of the pitch control rod 20 is articulately connected to a swashplate assembly 22. The swashplate assembly 22 converts control movements in the non-rotating reference frame into the rotating reference frame.

The swashplate assembly 22 includes a rotationally stationary swashplate 24 and rotational swashplate 26 which rotates relative to the rotationally stationary swashplate 24 through a bearing system 25. A stationary scissors assembly 28 is mounted between the rotationally stationary swashplate 24 and the airframe 14. A rotational scissors assembly 30 is mounted to the rotational swashplate 26 and the rotor hub H for rotation therewith (also illustrated in FIG. 2B).

The swashplate 22 receives control inputs through a set of servo control rods 32 which are each driven by a respective main rotor servo 32S. Three main rotor servos 32S are typical to allow the swashplate assembly 22 to move with three degrees of freedom; however, any other number of main rotor servos may alternatively be utilized.

Pitch control commands imparted through the servo control rods 32 cause tilting of the swashplate assembly 22 about a uniball 34 (FIG. 2C) which defines a central pivot point 36 located along the axis of rotation A. The rotationally stationary swashplate 24 is mounted to a swashplate guide 35, arranged concentrically with a rotor shaft, through the uniball 34 that permits tilting of the swashplate 22 about a virtual pivot point 36 and translation thereof along the axis of rotation A (FIG. 2C). Tilting of the swashplate assembly 22 about the central pivot point 36 imparts pitch change loads to each rotor blade B through the pitch control rods 20 which are mounted to the rotational swashplate 26. Articulation of the swashplate assembly 22 drives the pitch control rods 20 which cause the rotor blade B to pitch about the pitch change axis P. Inputs from the servo control rods 32 cause the swashplate assembly 22 to axially translate along axis of rotation A to impart pitch control loads to the blades B. When the swash plate assembly 22 translates along axis A, it imparts a collective pitch change to the blade assemblies and when it tilts about virtual pivot point 36, it imparts cylic pitch change. It should be understood that the swashplate configuration illustrated and described herein is intended as an example only. Other embodiments, such as where the uniball 34 is mounted to the rotating swashplate 26 for example, are also contemplated herein. While described in terms of a guide 35 surrounding a rotor shaft, it is understood that, in aspects of the invention such as a coaxial aircraft, the guide 25 could be a shaft or mast to one of the upper or lower rotor systems.

Referring now to FIGS. 3-6, the swashplate guide 35 is illustrated in more detail. The swashplate guide 35 includes a substantially hollow cylindrical tube 40. While conventional swashplate guides 35 are typically formed from an aluminum material, the cylindrical tube 40 disclosed herein is formed from a composite material, such as a fiberglass-epoxy or a graphite-epoxy for example.

Due to the tight fit between the inner diameter of the spherical uniball 34 and the exterior surface 42 of the cylindrical tube 40 of the swashplate guide 35, in some embodiments, the coefficient of thermal expansion of the cylindrical tube 40 is selected to ensure a constant fit between the swashplate guide 35 and the uniball 34. For example, the coefficient of thermal expansion of the cylindrical tube 40 may be selected based on the material and/or the coefficient of thermal expansion of the spherical uniball 34 such that a tight slip-fit is maintained within the range of allowable tolerance. The material of the cylindrical tube 40 may be selected to ensure that spherical uniball 34 can translate along the surface of the cylindrical tube 40 without seizing due to insufficient clearance and without cocking or hangups due to too large a clearance. In an embodiment, the material of the cylindrical tube 40 is the same as the material of the spherical bearing 34. For example, the cylindrical tube 40 and the spherical bearing 34 can be made of the same composite material. However, embodiments where the cylindrical tube 40 and the uniball 34 are formed from different materials, such as where the cylindrical tube is formed from a composite material and the uniball 34 is formed from a non-composite material are also within the scope of the disclosure.

The cylindrical tube 40 may be formed by braiding, winding, or hand or automatic layup of various plies about a mandrel to achieve desired laminate properties. In an embodiment, the plies including include a matrix containing reinforcing fibers. The material of the fibers includes one or more of a unidirectional carbon (graphite), fiberglass yarn (tows) or a hybrid of carbon and fiberglass to optimize strength, stiffness and the coefficient of thermal expansion. The manufacturing process may include dry fiber placement and resin injection into a closed mold, or alternatively, may include using fibers pre-impregnated with resin and cured in an autoclave. The matrix resin within which the fibers are supported may include an epoxy or high temperature adhesive, such as Bismaleimide (BMI) resin for example. In an embodiment, the plies may be layered or arranged such that the fibers within each ply are oriented to achieve a specific coefficient of thermal expansion oriented in a desired direction, such as a radial coefficient of thermal expansion via circumferential and longitudinal fibers for example.

A coating may be applied to the exterior surface 42 of the composite cylindrical tube 40 to form a hardened bearing surface. In an embodiment, the coating is a flame-spray coating, such as a silicon-carbide spray for example. In embodiments where a coating is applied to the outer surface 42 of the cylindrical tube 40, the exterior 42 of the tube 40 may be subsequently ground to achieve a desired surface finish.

Figure 3:
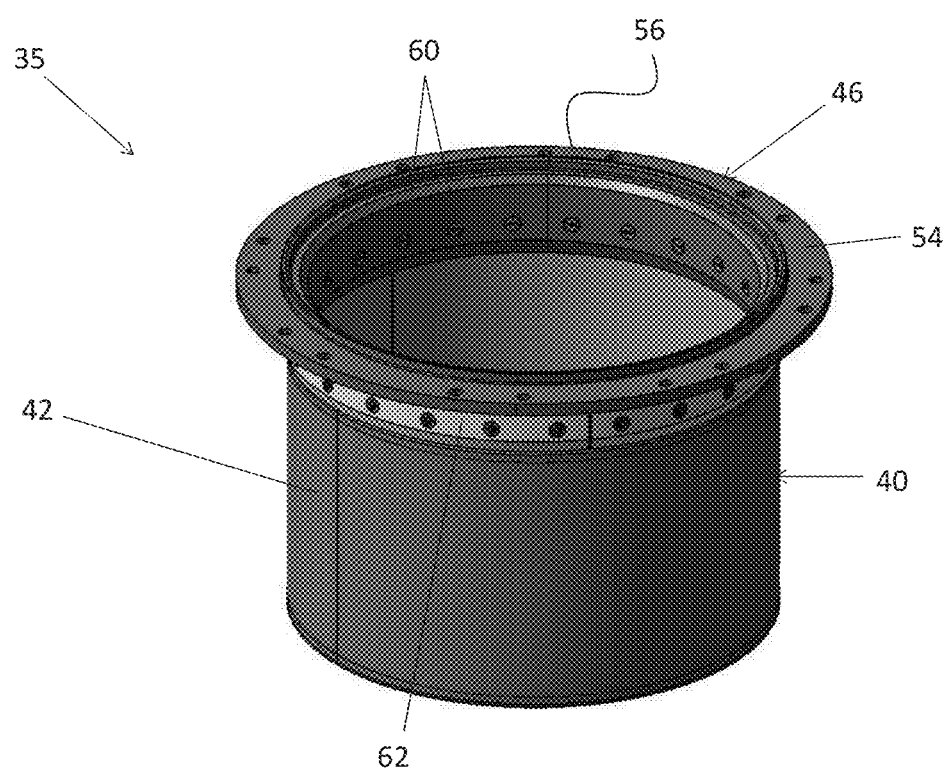
FIG. 3 is a perspective view of a swashplate guide according to an embodiment.
Figure 4:
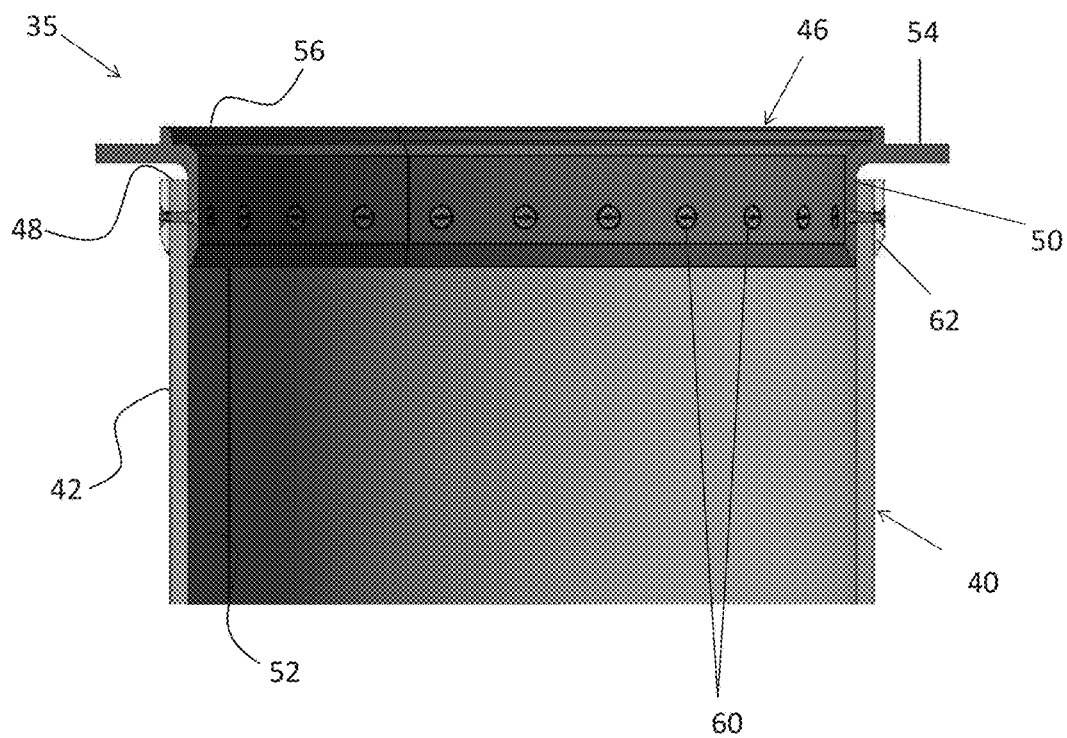
FIG. 4 is a cross-sectional view of the swashplate guide of FIG. 3 according to an embodiment.
Figure 5:
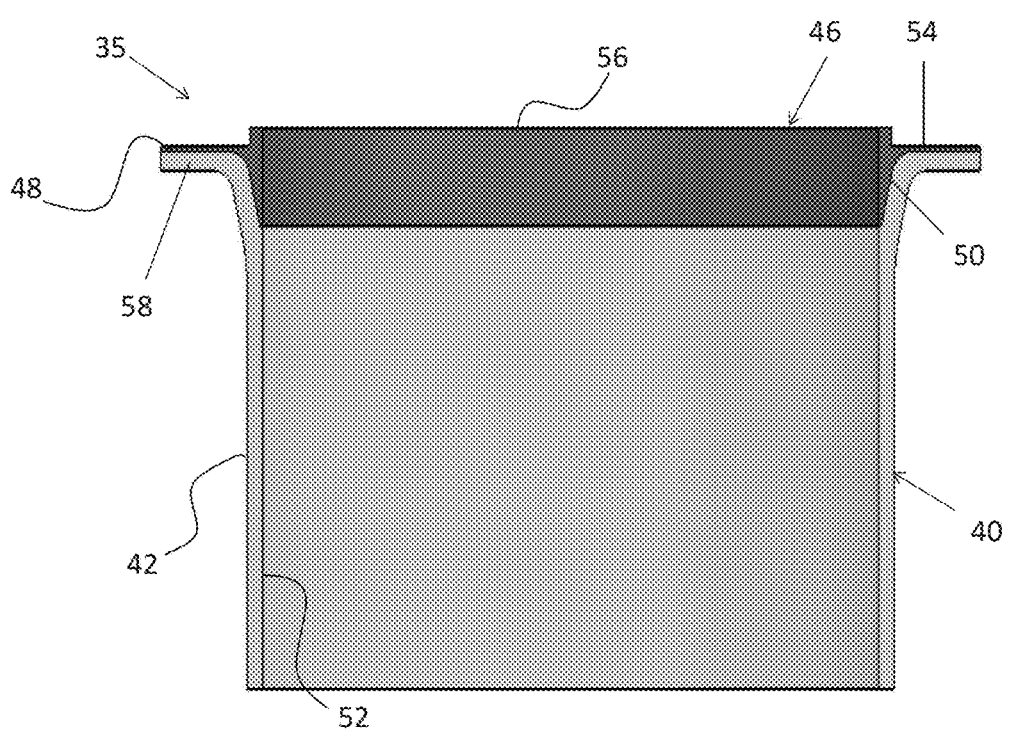
FIG. 5 is a cross-sectional view of a swashplate guide according to another embodiment.

The swashplate guide 35 additionally includes a pilot 46 intended to provide an interface with another portion of the aircraft 10. For example, the pilot 46 may be coupled to a portion of the main gearbox to react shear loads from the swashplate guide 35 to the main gearbox. The pilot 46 may be a separate component, as shown in FIGS. 3-5, or alternatively, may be integrally formed with the upper end 48 of the cylindrical body 40 (see FIG. 6). In embodiments where the pilot 46 is a separate component, the pilot 46 is generally formed from a metal material, such as aluminum for example, and is at least partially receivable within the hollow interior of the cylindrical tube, for example adjacent an upper end of the cylindrical tube. However, embodiments where the pilot 46 is formed from a non-metal material, such as a composite material similar to or distinct from the composite material of the cylindrical tube 40 for example, are also contemplated herein. The body of the pilot 46 is also generally cylindrical in shape, and has an exterior surface 50 sized and shaped to be generally complementary to the interior surface 52 of the cylindrical tube 40.

In an embodiment, a flange 54 extends radially outwardly from the exterior surface 50 of the pilot 46. When the pilot 46 is associated with the cylindrical tube 40, the flange 54 is located between the upper end 48 of the cylindrical tube 40 and an upper end 56 of the pilot 46. The cylindrical tube 40 may, but need not include a flange 58 extending radially outwardly, parallel to the flange 54 of the pilot 46. In embodiments where both the cylindrical tube 40 and the pilot 46 include a flange 58, 54, the flange 54 of the pilot 46 may be located upwardly adjacent and in contact with the flange 58 of the cylindrical tube 40, as shown in FIG. 6.

In the embodiments illustrated in FIGS. 3-5, the pilot 46 is a separate component removably or fixedly connected to the cylindrical tube 40. With further reference to FIGS. 3-4, the pilot 46 may be mechanically coupled to the cylindrical tube 40 via a plurality of fasteners 60, such as through bolts for example. In such embodiments, a split outer ring 62, such as formed form aluminum or another metallic material, may be arranged concentrically with the pilot 46 and the cylindrical tube 40 such that the fasteners 60 extend through the split outer ring 62, the cylindrical tube 40, and the pilot 46. In another embodiment, as illustrated in FIG. 5, the pilot 46 may be bonded to or co-cured with the cylindrical tube 40.

Figure 6:
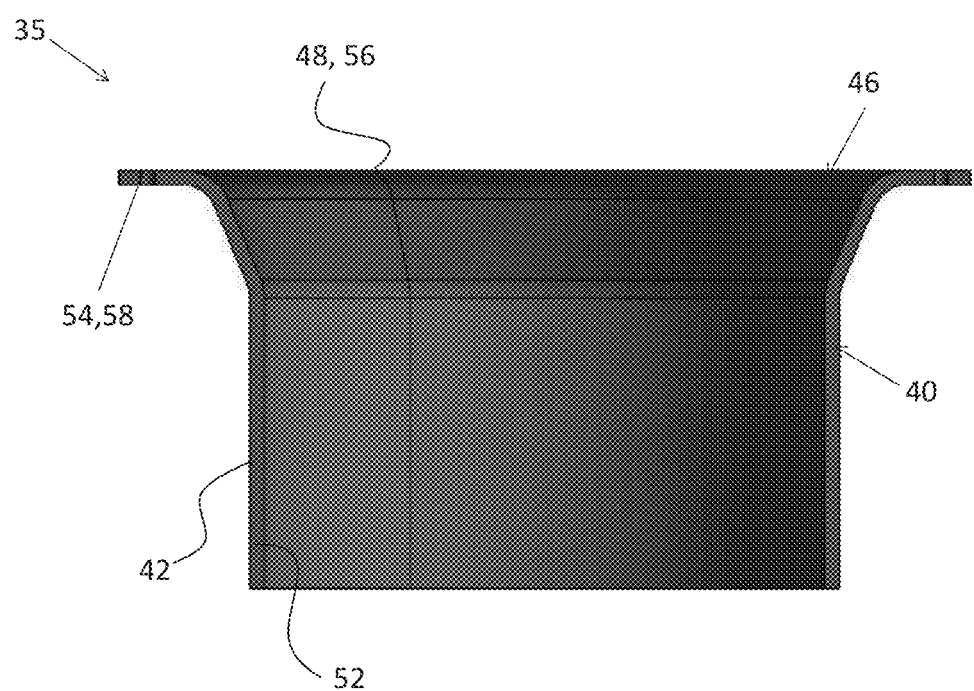
FIG. 6 is a cross-sectional view of a swashplate guide according to another embodiment.

In the non-limiting embodiment illustrated in FIG. 6, the pilot 46 is integrally formed with the upper surface 48 of the cylindrical tube 40. As a result, the portion of the swashplate guide 35 adjacent the upper surface 48 gradually increases in diameter and includes an outwardly extending flange configured to provide an interface with another portion of the aircraft 10.

The swashplate guide 35 illustrated and described herein provides a guiding surface for the uniball bearing 34 of swashplate assembly. The use of alternative materials to form the swashplate guide 35 not only provides improved resistance to exposure to the corrosive environments and thermal fluctuations, but also has a reduced weight.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A swashplate guide for use with a spherical bearing and which connects with an adjacent component, the swashplate guide comprising:
   a hollow cylindrical tube formed from a composite material, an exterior surface of the hollow cylindrical tube provides an engagement surface with the spherical bearing; and
   a flange at an end of the hollow cylindrical tube that provides an interface with the adjacent component.

2. The swashplate guide according to claim 1, wherein the exterior surface of the hollow cylindrical tube includes a coating.

3. The swashplate guide according to claim 1, wherein the exterior surface of the hollow cylindrical tube has a desired surface finish compatible for use with the spherical bearing.

4. The swashplate guide according to claim 1, wherein the hollow cylindrical tube has a coefficient of thermal expansion such that a constant fit is generated between the swashplate guide and the spherical bearing.

5. The swashplate guide according to claim 4, wherein the composite material includes one or more plies containing a matrix having reinforcing fibers, and the coefficient of thermal expansion is achieved by orienting the fibers in a desired direction.

6. The swashplate guide according to claim 4, wherein the composite material of the hollow cylindrical tube is substantially identical to a material of the spherical bearing.

7. The swashplate guide according to claim 1, further comprising a pilot associated with the hollow cylindrical tube, wherein the flange extends from a portion of the pilot.

8. The swashplate guide according to claim 7, wherein the pilot is removably coupled to the hollow cylindrical tube.

9. The swashplate guide according to claim 7, wherein the pilot is co-cured to the hollow cylindrical tube.

10. The swashplate guide according to claim 7, wherein the pilot is formed from a metal material.

11. The swashplate guide according to claim 7, wherein the pilot is integrally formed with an upper end of the hollow cylindrical tube.

12. A rotor system comprising:
- a rotationally stationary swashplate pivotally mounted about a central pivot point defined along an axis of rotation;
- a rotational swashplate which defines a rotor pitch control point, said rotor pitch control point defined along an in-line plane which passes through said central pivot point;
- a bearing system configured to allow the rotational swashplate to rotate relative to the rotationally stationary swashplate; and
- a swashplate guide for receiving a shaft and mating to an adjacent component, the swashplate guide including a hollow cylindrical tube formed from a composite material, a spherical bearing being mounted concentrically about an exterior surface of the hollow cylindrical tube such that the hollow cylindrical shaft provides an engagement surface for the spherical bearing, wherein the swashplate guide includes a flange that provides an interface with the adjacent component.

13. The rotor system according to claim 12, wherein the rotor system is a portion of an aircraft.

14. The rotor system according to claim 12, wherein the composite material includes a matrix containing fibers formed from at least one of fiberglass and graphite.

15. An aircraft using the rotor system according to claim 12.

* * * * *